United States Patent [19]

Tatsuo

[11] 4,346,623
[45] Aug. 31, 1982

[54] VARIABLE SPEED PLANETARY TRANSMISSION

[75] Inventor: Masahiro Tatsuo, Komatsu, Japan

[73] Assignee: Kabushiki Kaisha Komatsu Seisakusho, Tokyo, Japan

[21] Appl. No.: 125,589

[22] Filed: Feb. 28, 1980

[30] Foreign Application Priority Data

Feb. 28, 1979 [JP] Japan ............................ 54-24208[U]

[51] Int. Cl.³ ...................... F16H 57/10; F16H 37/00
[52] U.S. Cl. ........................................ 74/764; 74/740; 74/768
[58] Field of Search ................. 74/740, 750 R, 753, 74/764, 765, 770, 768, 785, 788

[56] References Cited

U.S. PATENT DOCUMENTS

| | | | |
|---|---|---|---|
| 3,318,174 | 5/1967 | Clapp et al. | 74/753 |
| 3,815,445 | 6/1974 | Gorrell et al. | 74/740 |
| 3,877,321 | 4/1975 | Storer, Jr. | 74/768 |
| 3,941,013 | 3/1976 | Miller | 74/740 |
| 4,074,592 | 2/1978 | Stevens et al. | 74/740 |
| 4,088,043 | 5/1978 | Johnson et al. | 74/740 X |
| 4,178,813 | 12/1979 | Smemo | 74/740 X |

FOREIGN PATENT DOCUMENTS 355895  9/1931  United Kingdom ................ 74/764

*Primary Examiner*—Leslie Braun
*Assistant Examiner*—Lawrence J. Gotts
*Attorney, Agent, or Firm*—Armstrong, Nikaido, Marmelstein & Kubovcik

[57] ABSTRACT

A variable speed transmission including a transfer section for establishing operating direction, a variable speed planetary transmission section arranged in operating alignment with the transfer section, and a range section for effectively multiplying the number of speed ratios established by the variable speed planetary transmission section. The transfer section includes a pair of planetary gear train, sun gears of which are coupled with a power input shaft and the variable speed planetary transmission section comprises four sets of planetary gear trains, all sun gears of which are coupled with a center shaft which is arranged in alignment with the power input shaft.

3 Claims, 2 Drawing Figures

VARIABLE SPEED PLANETARY TRANSMISSION

BACKGROUND OF THE INVENTION

This invention relates to a variable speed planetary transmission adapted to have a relatively uniform step or percentage change between speed ratios or changes, and in particular to a transmission having a variable speed section providing four different speed ratios and a range section providing for operation of the transmission in high and low ranges so that the transmission effectively provides for eight speed ranges.

U.S. Pat. No. 3,815,445 is concerned with a variable speed transmission provided with a transfer section for establishing operating direction and a variable speed planetary transmission section. In this patent, however, since the transfer section is not formed by a planetary gear arrangement but by a multi-shaft arrangement, the overall structure of the variable speed transmission becomes bulky, especially in a radial direction.

SUMMARY OF THE INVENTION

It is therefore an object of the present invention to provide a variable speed transmission having a transfer section, a variable speed planetary transmission section, and a range section wherein the transfer section is also formed by a planetary gear arrangement and all of the sections are disposed in alignment with one another.

Another object of the present invention is to provide a variable speed transmission which is made compact by forming the transfer section into planetary gear arrangement and improving the coupling between each of the planetary gear trains.

In accordance with an aspect of the present invention, there is provided a variable speed transmission including a transfer section for establishing operating direction, a variable speed planetary transmission section arranged in operating alignment with said transfer section, and a range section for effectively multiplying the number of speed ratios established by said variable speed planetary transmission section, said transfer section comprising a power input shaft, and a planetary gear train for forward for operation having a sun gear, a planet gear set, a carrier, a ring gear and brake means for selectively stopping the ring gear, and a planetary gear train for reverse operation having a sun gear, a planet gear set, a carrier, a splined annulus gear, and brake means for selectively stopping the carrier, the sun gears of both said planetary gear trains being coupled with said power input shaft; said variable speed planetary transmission section comprising a center shaft aligned with said power input shaft, and first, second, third and fourth planetary gear trains coupled in succession each having a sun gear, a planet gear set, a carrier, a ring gear and brake means for selectively stopping the ring gear, the carrier of one of said planetary gear trains for forward operation of the transfer section being operatively coupled with the carrier of said fourth planetary gear train; and said range section comprising a power output shaft aligned with said center shaft, a planetary gear train having a sun gear, a planet gear set, a carrier, a ring gear, and brake mens for selectively stopping the ring gear, the carrier of said planetary gear train being operatively coupled with said power output shaft, and clutch means for selectively directly coupling said center shaft with said power output shaft.

The carrier of the first planetary gear train is coupled with the ring gear of the second planetary gear train and the carrier of the second planetary gear train is coupled with the ring gear of the third planetary gear train while the carrier of the third planetary gear train is integrally formed with the carrier of the fourth planetary gear train. All sun gears of the first, second, third and fourth planetary gear trains are coupled with the center shaft.

Therefore when the brake means for the first planetary gear train is applied, power is transmitted to the center shaft through the sun gears of the first, second and third planetary gear trains.

Similarly, when the brake means for the second planetary gear train is applied, power is transmitted to the center shaft through the sun gears of the second and third planetary gear trains. Accordingly, sun gear torque of the first and second planetary gear trains can be made small which contributes to a compact design of the overall variable speed transmission structure.

The above and other objects, features and advantages of the present invention will be readily apparent from the following description taken in conjunction with the accompanying drawing.

DETAILED DESCRIPTION OF THE INVENTION

Figure 1:
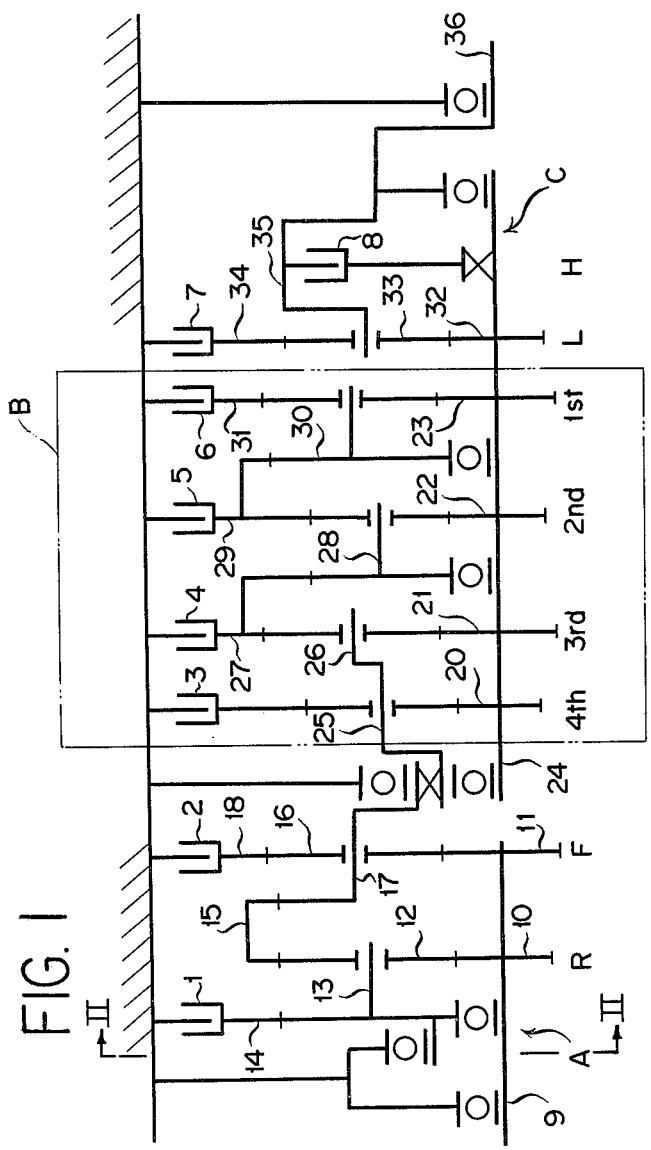
FIG. 1 is a schematic view showing a variable speed transmission according to the present invention.
Figure 2:
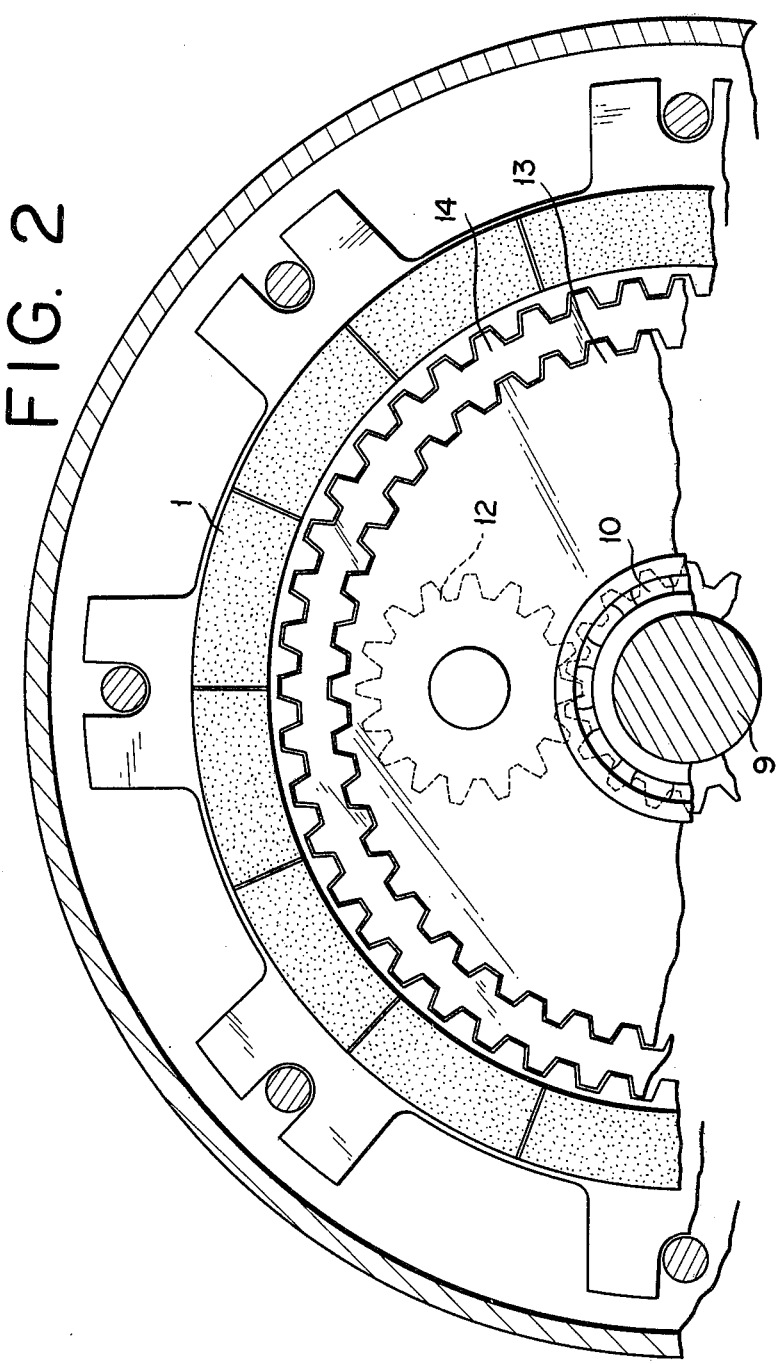
FIG. 2 is a partial cross-sectional view taken along line II—II of FIG. 1.

The present invention will now be described in detail with reference to the accompanying drawing. The transmission illustrated in the drawing comprises a transfer section A for establishing operating direction, a variable speed planetary transmission section B arranged in operating alignment with the transfer section A, and a range section C which effectively multiplies the number of speed ratios established by the variable speed planetary transmission section B. These three transmission sections are operated by a plurality of brakes 1–7 and a clutch 8. For purposes of the present invention, it is noted that the brakes 1–7 nd the clutch 8 may be composed of interleaved plates with hydraulic cylinder means conventionally providing for selective engagement and disengagement of the brakes and clutch. The transfer section A includes a power input shaft 9 coupled to an engine or prime mover (not shown) in a conventional manner and driven thereby. Coupled with the power input shaft 9 are sun gears 10 and 11 of a pair of planetary gear trains for reverse and forward operations R and F, respectively. The planetary gear train for reverse operation R comprises the sun gear 10, a planet gear set 12, a carrier 13, a splined annulus gear 14 and ring gear 15, while the planetary gear train for forward operation F includes the sun gear 11, a planet gear set 16, a carrier 17 and a ring gear 18.

Splined annulus gear 14 is adapted to be selectively coupled with the brake 1 and is fixedly connected with the carrier 13 by a gear coupling. The gear 14 can be considered functionally as a portion of carrier 13. The ring gear 15 of the reverse operation R is coupled by gears with the carrier 17 of the forward operation F.

The variable speed planetary transmission section B comprises a succession of first, second, third and fourth planetary gear trains. The succession of planetary gear trains is operated in a generally conventional manner by the brakes 3–6 which may be selectively actuated to prevent rotation of a ring gear in each of the planetary gear trains. Each of the planetary gear trains includes a sun gear, a planet gear set, a carrier, and a ring gear. Sun gears 20–23 are coupled with a center shaft 24 which is arranged in alignment with the power input shaft 9.

The carrier 17 of the planetary gear train for the forward operation F is connected with a carrier 25 of the fourth planetary gear train by splines while a carrier 26 of the third planetary gear train is integrally formed with the carrier 25 of the fourth planetary gear train. A ring gear 27 of the third planetary gear train is coupled by gears with a carrier 28 of the second planetary gear train while a ring gear 29 of the second planetary gear train is coupled by gears with a carrier 30 of the first planetary gear train. The interconnection of the first, second and third planetary gear trains is of particular importance within the present invention for establishing torque distributions among the sun gears 21 to 23 when the first or second planetary gear train is set in operation. That is, when the brake 6 is operated for stopping the rotation of a ring gear 31 of the first planetary gear train, the power is transmitted to the center shaft 24 through the sun gears 21 to 23 and when the brake 5 is opearted for stopping the rotation of the ring gear 29 of the second planetary gear train, the power is transmitted to the center shaft 24 through the sun gears 21 and 22. For the third transmission, power is transmitted to the center shaft 24 through the single sun gear 21 and for the fourth transmission, power is transmitted to the center shaft 24 through the single sun gear 20.

The range section C includes a planetary gear train for low speed range L having a sun gear 32, a planet gear set 33, a carrier 34 and a ring gear 35, a power output shaft 36 which is arranged in alignment with the center shaft 24, and the clutch 8 for directly coupling the center shaft 24 with the power output shaft 36 when engaged. The carrier 35 is coupled with the power output shaft 36 and when the clutch 8 is engaged, the high speed range H is established.

Table I shows one example of reduction ratios between the speed ranges of the embodiment shown in the drawing.

TABLE I

| Speed Range | 1 | 2 | 3 | 4 | 5 | 6 | 7 | 8 |
|---|---|---|---|---|---|---|---|---|
| Reduction Ratio | 1.35 | 1.47 | 1.44 | 1.38 | 1.35 | 1.47 | 1.44 | |

Table II shows the operating combinations of the various brakes and clutches which are engaged within the transmission to provide the various speed ranges or ratios in each operating direction.

TABLE II

| Speed Range | 1 | 2 | 3 | 4 | 5 | 6 | 7 | 8 |
|---|---|---|---|---|---|---|---|---|
| Clutches and Brakes For. Engaged | 2-6-7 | 2-5-7 | 2-4-7 | 2-3-7 | 2-6-8 | 2-5-8 | 2-4-8 | 2-3-8 |

TABLE II-continued

| Speed Range | 1 | 2 | 3 | 4 | 5 | 6 | 7 | 8 |
|---|---|---|---|---|---|---|---|---|
| Rev. | 1-6-7 | 1-5-7 | 1-4-7 | 1-3-7 | 1-6-8 | 1-5-8 | 1-4-8 | 1-3-8 |

While a single specific embodiment of the invention has been shown and described herein, it is to be understood that the same is merely illustrative of the innventive concept and that other embodiments may be resorted to within the scope of the appended claims.

What I claim is:

1. A variable speed transmission including a transfer section for establishing operating direction, a variable speed planetary transmission section arranged in operating alignment with said transfer section, and a range section for effectively multiplying the number of speed ratios established by said variable speed planetary transmission section, said transfer section comprising a power input shaft, a planetary gear train for forward operation having a sun gear, a planet gear set, a carrier, a ring gear and brake means for selectively stopping the ring gear, and a planetary gear train for reverse operation having a sun gear, a planet gear set, a carrier and brake means for selectively stopping the carrier, the sun gears of both said planetary gear trains being coupled with said power input shaft; said variable speed planetary transmission section comprising a center shaft aligned with said power input shaft, and first, second, third and fourth planetary gear trains coupled in succession, each having a sun gear, a planet gear set, a carrier, a ring gear and brake means for selectively stopping the ring gear, the carrier of one of said planetary gear trains for forward operation of the transfer section being operatively coupled with the carrier of said fourth planetary gear train; and said range section comprising a power output shaft aligned with said center shaft, a planetary gear train having a sun gear, a planet gear set, a carrier, a ring gear, and brake means for selectively stopping the ring gear, the carrier of said planetary gear train being operatively coupled with said power output shaft, and clutch means for selectively directly coupling said center shaft with said power output shaft wherein the carrier of said first planetary gear train is coupled with the ring gear of said second planetary gear train, the carrier of said second planetary gear train is coupled with the ring gear of said third planetary gear train, and the carrier of said third planetary gear train is integrally formed with the carrier of said fourth planetary gear train.

2. A variable speed transmission as recited in claim 1 wherein every sun gear of said first, second, third and fourth planetary gear trains is coupled with said center shaft.

3. A variable speed transmission as recited in claim 1 wherein the other planetary gear train for reverse operation of the transfer section includes first and second ring gears, said first ring gear being adapted to couple with the brake means thereof and with the carrier, said second ring gear being coupled with the carrier of said planetary gear train for forward operation.

* * * * *